United States Patent [19]
Klotz

[11] 3,879,211
[45] Apr. 22, 1975

[54] CERAMIC PRODUCT AND METHOD OF MAKING SAME

[76] Inventor: Joseph M. Klotz, 341 Santa Monica, Corpus Christi, Tex. 78411

[22] Filed: June 14, 1973

[21] Appl. No.: 369,913

[52] U.S. Cl........ 106/67; 106/63; 106/65; 106/73.4; 106/73.6; 106/110
[51] Int. Cl............................................ C04b 33/00
[58] Field of Search ........... 106/73.4, 73.6, 65, 110, 106/63, 67, 68

[56] References Cited
UNITED STATES PATENTS

| | | | |
|---|---|---|---|
| 855,136 | 5/1907 | Sakurai | 106/65 |
| 1,942,431 | 1/1934 | Jung | 106/65 X |
| 3,640,739 | 2/1972 | Bakker | 106/65 |

FOREIGN PATENTS OR APPLICATIONS

| | | | |
|---|---|---|---|
| 94,979 | 9/1965 | France | 106/39.6 |
| 1,230,343 | 12/1966 | Germany | 106/65 |
| 568,586 | 1/1959 | Canada | 106/65 |

Primary Examiner—Winston A. Douglas
Assistant Examiner—John F. Niebling
Attorney, Agent, or Firm—W. F. Hyer; Marvin B. Eickenroht

[57] ABSTRACT

A ceramic product is provided comprising, as initial ingredients, from 81 to 97 percent of red mud containing at least 40 percent iron expressed as $Fe_2O_3$, from 2 to 9 percent of sodium bentonite or from 2 to 25 percent of calcium bentonite, and from 0 to 10 percent of calcium sulfate, the product being vitrified by firing at a temperature in the range of 1950° to 2500° F. Also, a method of making a product of the above composition is provided wherein the ingredients mentioned above are blended together with sufficient water to provide a cohesive but formable mass. After forming into a desired shape, this mass is exposed to an atmosphere which is substantially saturated with water and then fired in the aforesaid temperature range for a period of time to cause the mass to be vitrified.

8 Claims, No Drawings

CERAMIC PRODUCT AND METHOD OF MAKING SAME

This invention relates to a ceramic product utilizing red mud which is rich in iron content as its principal component and which, for example, is usable as building brick or tile. In another of its aspects, it relates to an improved method, although not the only one, for producing such a ceramic product.

In the commercial treatment of bauxite ore to extract the oxides of aluminum therefrom, such as in the well known Bayer process, the bauxite is digested with a sodium hydroxide solution and filtered. The dissolved aluminum compounds are separated from the undissolved iron containing residue, the latter commonly being termed "red mud." The red mud has in the past been piped to settling ponds once the available alumina has been leached out and most of the alkali has been washed out for recycling. These ponds are most unsightly and take up a great amount of land. Also, the residual caustic content of the red mud in the pond poses a serious threat to animal and plant life.

Various suggestions have been made in the past for utilizing red mud. For example, U.S. Pat. No. 2,842,434 suggests using red mud in an ore beneficiating process. Also, West German Pat. No. 2,063,028 suggests using red mud as the main component in the production of bricks. However, the red mud of the West German patent is one of relatively low iron content (i.e. 25 percent $Fe_2O_3$ on a dry weight basis) and the green bricks are fired at a relatively low temperature (1652° to 1832° F.). When red mud having a relatively high iron content (at least 40 percent expressed as $Fe_2O_3$ on a dry weight basis) is used, special problems can arise in connection with the production of a satisfactory ceramic product. For example, firing at a temperature within the range set out in the West German patent will result in a product which is not vitrified and one which will become brittle, lose most of its spalling resistance and effloresce within a few days after firing. On the other hand, firing at excessively high temperatures can result in an iron rich flux weeping during firing from the ceramic material.

It has now been found that red mud rich in iron content can be successfully used to produce useful ceramic products, especially building brick and tile. Thus a vitrified ceramic product is provided comprising, as initial ingredients, from 81 to 95 percent of red mud containing at least 40 percent iron expressed as $Fe_2O_3$, from 2 to 9 percent of sodium bentonite or from 2 to 25 percent calcium bentonite, and from 0 to 10 percent of calcium sulfate, the product being vitrified by firing at a temperature in the range of 1950° to 2500° F. for a period of time sufficient to cause such vitrification.

The red mud useful in accordance with this invention can vary somewhat in its chemical content. A typical range of composition is as follows:

| Element | Expressed As | Weight Percent Dry Basis |
|---|---|---|
| Fe | $Fe_2O_3$ | 42–50 |
| Al | $Al_2O_3$ | 13–22 |
| Si | $SiO_2$ | 7–8 |
| Ti | $TiO_2$ | 5–7 |
| Na | $Na_2O$ | 5–9 |

The iron content, expressed as $Fe_2O_3$, can range as high as 80 percent with the other elements being present in lesser amounts than is shown in the above table. Usually the amount of the element Al will exceed the respective amounts of Si, Ti and Na when expressed as the oxides of the table. The red mud can also contain variable amounts of calcium oxide and lesser amounts of other oxides. A more preferred range of the red mud used as a starting material is 90 to 95 percent of the total combined weight of the red mud, bentonite and calcium sulfate, if any.

The sodium bentonite employed in making the product of this invention is openly available on the market and is commonly termed Wyoming bentonite. It is commonly used an an ingredient in formulating drilling muds. It is of a colloidal nature when hydrated and it is believed that this characteristic is important in formulating the red mud ceramic. While the amount employed as a starting ingredient can vary over the range of 2 to 9 weight percent, an amount in the range of 2 to 4 percent is preferred with about 4 percent being optimum. Increasing the amount to the 5 to 9 percent range usually does not appreciably increase the desirable properties of the ceramic but can cause the starting mixture, when hydrated as explained below, to become sticky and more difficult to work into a desired shape. Bentonite in amounts exceeding about 10 percent will cause excessive cracking in the product resulting in a low production efficiency or none at all.

Calcium bentonite can be used to replace, in whole or in part, the sodium bentonite. The amount of calcium bentonite employed can be within the ranges as stated above for sodium bentonite although these ranges can be exceeded and still not change the appearance or character of the product. Thus, the amount of calcium bentonite can be increased up to about three times the amount stated above for the upper limits of the sodium bentonite ranges.

While a usable product can be made without adding calcium sulfate (e.g., plater of paris) it is preferred to add, as a starting ingredient, from 2 to 8 percent calcium sulfate and most preferably 7 to 8 percent. This material improves the drying and setting properties and also results in an improvement in product quality. The calcium sulfate can be anhydrous or partially or fully hydrated but generally, the lower the water of hydration, the better the results.

The red mud starting material should be sufficiently dry as to be substantially devoid of free water. Preferably, it should also be devoid of any water of crystallization but this is not essential. It can be dried in any conventional manner such as in a drying kiln. The iron content of the red mud is important; the higher the iron content the better the product. It is also important that the red mud have a lime (expressed as CaO) content of less than about 7.5 percent. This will prevent adhesion of the greenware to its support during firing.

In accordance with the process of this invention, the dried red mud is milled with the selected amounts of bentonite and of calcium sulfate (if used) with sufficient mixing to homogenize the dry mixture. The average particle size should be between 10 and 35 microns. After mixing, the dry mixture is hydrated by blending in water in an amount within the range of 90 to 150 gallons per ton of dry material with the amount being such that a cohesive but formable mass is obtained. After this blending, the wet mixture is preferably allowed to remain quiescent for a period of time, the duration of which is not critical but desirable results may be obtained in approximately 30 minutes. While this is not an essential step of the process and the mechanisms involved are not clear, it has been found that there is a definite improvement in the workability of the mixture. While the mixture is thus remaining quiescent, it is desirable to prevent its surface from drying by storing it in a covered location and if the time is to greatly exceed 30 minutes, the material should be covered to prevent air circulation from drying the material.

The mixture is then molded into a desired shape by the application of pressure, such as, for example, using conventional procedures for forming conventional brick and tile.

In accordance with the method of this invention, the formed greenware is next equilibrated, at least at its surface, with a heated atmosphere substantially saturated with water vapor. It has been found that this procedure greatly reduces, if not entirely eliminates, excessive shrinking of the surface of the greenware during the drying with a resultant cracking thereof. Thus, the formed greenware can be placed in a suitable chamber to which steam is added while the chamber is maintained at substantially atmospheric pressure. The temperature in the chamber should be in the range of 100° to 212° F. and the time the greenware remains in the chamber is not critical but should be at least twenty minutes. After the greenware has thus been equilibrated, it should be immediately transferred to a dryer and not permitted to cool before the drying occurs. If it is permitted to cool excessively, the equilibrating effect will be lost and cracking will be more likely to occur during the drying phase. The initial temperature of the atmosphere during the drying step should be about 250° F. for the first half hour or so and then the temperature may be increased, as for example, at the rate of 100° F. per hour until the temperature in the dryer reaches about 425° F. The greenware should remain in the dryer until it is substantially dry and it has been found that 5 hours of drying at 425° F. is adequate. However, lower temperatures (e.g., 200° F.) can be used by increasing the drying time (e.g., to 24 hours).

The dried greenware can be placed directly in a firing furnace or stored in a dry area. The length of time for storage of the dried greenware can be indefinite provided the storage area is kept dry and has a low humidity.

In either event, the greenware is fired at a furnace temperature in the range of 1950° to 2500° F., preferably in the range of 1950° to 2200° F. until it becomes vitrified. The firing temperature is limited by the iron content of the red mud used as a starting ingredient. Thus the maximum firing temperature should decrease toward 1950° F. as the iron content increases. Greenware made from red mud having an iron content of about 40–42 percent can be fired at any temperature in the foregoing range. However, as the iron content increases, for example, to 50–55 percent, the firing temperature should be limited to the lower portion of the range, e.g., 1950°–2000° F. As the iron content increases even further, the firing temperature should be close to 1950° F. If the firing temperature is too high, an iron rich flux will weep from the product and preferably, the firing temperature will be slightly (e.g., 25° F.) below that temperature at which this fluxing occurs. The optimum firing temperature for any given iron content can be determined through mere routine testing.

Usually the time for firing will be a minimum of 10 hours up to a maximum of 20 hours. This time period does not include the time for temperature buildup if the furnace is started cold. A preferred procedure is to have the furnace initially at about 425° F. when the greenware is deposited therein. Thereafter the furnace temperature can be raised as rapidly as desired as long as the rate does not cause the greenware to undergo thermal shock with resultant cracking. As indicated, a firing time of ten hours is satisfactory. If less time is used, e.g., 8 hours, scumming occurs. The greenware can be fired more than 10 hours but excessive firing times result in waste of heat without any improvement in the properties of the ceramic product.

Firing at too low a temperature or for too short a time will result in the product not vitrifying. Instead it will become brittle, lose most of its spalling resistance and effloresce within a few days after firing.

After the firing is completed, the cooling should not be rapid and the ceramic product should not be exposed to drafts of air. The drying atmosphere need not contain any special gases as the color appears to remain stable after firing. The product when fired in a reducing atmosphere will appear as a dark vitrious substance having some porosity.

EXAMPLE

A mixture was made to contain 95 percent of dried red mud, 4 percent sodium bentonite, and 1 percent calcium sulfate (plaster of paris). After sufficient water was added to give the mixture a workable consistency, the mixture was allowed to stand for approximately 30 minutes. It was then placed in a chamber and steam was added at such a rate that the chamber temperature was about 150° F. After 20 minutes of steaming, the mixture was removed and then fired for 10 hours at a temperature of about 2100° F. The resulting vitrified product had the following properties:

| Water Absorption | | |
|---|---|---|
| Percent | | 0.735 |
| | Specific Gravity | |
| Bulk saturated surface dry | | 2.686 |
| Bulk oven dried | | 2.667 |
| Apparent | | 2.720 |
| | Compressive Strength | |
| Pounds per square inch | | 26,825 |

All percentages expressed herein are weight percentages of (except water of hydration) material.

From the foregoing description of one embodiment of this invention by way of example, it will be seen that this invention is one well adapted to attain all of the ends and objects hereinabove set forth, together with other advantages which are obvious and which are inherent to the composition of matter and process method.

The invention having been described, what is claimed is:

1. A ceramic product made from an initial mixture comprising from 81 to 97 percent of red mud containing at least 40 percent iron expressed as $Fe_2O_3$, from 2 to 9 percent of sodium bentonite or calcium bentonite or mixtures thereof; and from 0 to 10 percent of calcium sulfate; said product being vitrified by firing said initial mixture at a temperature in the range of 1950° to 2500° F.

2. The product to claim 1 wherein the amount of red mud is in the range of 90 to 95 percent.

3. The product of claim 2 wherein the amount of sodium bentonite is in the range of 2 to 4 percent and the amount of calcium sulfate is in the range of 1 to 8 percent.

4. The product of claim 3 wherein the product is fired at a temperature in the range of 1950° to 2200° F.

5. The method of making a vitrified ceramic product which comprises forming a mixture of from 81 to 97 percent of red mud having at least 40 percent iron expressed as $Fe_2O_3$, from 2 to 9 percent sodium bentonite or calcium bentonite or mixtures thereof, and 0 to 10 percent of calcium sulfate; blending water into said mixture in an amount of 90 to 150 gallons of water per ton of said mixture, the amount of water being such that a cohesive but formable mass is obtained; forming the mass into a desired shape; exposing the shaped mass to an atmosphere substantially saturated with water and at a temperature in the range of 100° to 212° F.; and then firing the shaped mass by heating it to a temperature in the range of 1950° to 2500° F. for a period of time to cause the mass to be vitrified.

6. The method of claim 5 wherein the amount of red mud is in the range of 90 to 95 percent.

7. The method of claim 6 wherein the amount of sodium bentonite is in the range of 2 to 4 percent and the amount of calcium sulfate is in the range of 1 to 8 percent.

8. The method of claim 7 wherein the product is fired at a temperature in the range of 1950° to 2200° F.

* * * * *